US008198371B2

(12) United States Patent
Stack

(10) Patent No.: US 8,198,371 B2
(45) Date of Patent: Jun. 12, 2012

(54) BLENDS OF POLYESTERS AND ABS COPOLYMERS

(75) Inventor: Gary Michael Stack, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 406 days.

(21) Appl. No.: 12/390,694

(22) Filed: Feb. 23, 2009

(65) Prior Publication Data
US 2009/0326141 A1 Dec. 31, 2009

Related U.S. Application Data

(60) Provisional application No. 61/076,239, filed on Jun. 27, 2008.

(51) Int. Cl.
C08L 62/02 (2006.01)

(52) U.S. Cl. .......................................... 525/165

(58) Field of Classification Search .................. 525/165
See application file for complete search history.

(56) References Cited

U.S. PATENT DOCUMENTS

| 1,602,699 | A | 10/1926 | Nightingale |
| 2,160,841 | A | 6/1939 | Dreyfus |
| 2,202,046 | A | 5/1940 | Dreyfus et al. |
| 2,278,537 | A | 4/1942 | Dreyfus et al. |
| 2,720,507 | A | 10/1955 | Caldwell |
| 2,806,064 | A | 9/1957 | McKlveen |
| 2,901,466 | A | 8/1959 | Kibler |
| 2,936,324 | A | 5/1960 | Hasek et al. |
| 3,000,906 | A | 9/1961 | Hasek et al. |
| 3,030,335 | A | 4/1962 | Goldberg |
| 3,062,852 | A | 11/1962 | Martin et al. |
| 3,075,952 | A | 1/1963 | Coover et al. |
| 3,091,600 | A | 5/1963 | Caldwell et al. |
| 3,169,121 | A | 2/1965 | Goldberg et al. |
| 3,190,928 | A | 6/1965 | Elam et al. |
| 3,201,474 | A | 8/1965 | Hasek et al. |
| 3,207,814 | A | 9/1965 | Goldberg et al. |
| 3,218,372 | A | 11/1965 | Okamura et al. |
| 3,227,764 | A | 1/1966 | Martin et al. |
| 3,236,899 | A | 2/1966 | Clark |
| 3,249,652 | A | 5/1966 | Quisenberry |
| 3,259,469 | A | 7/1966 | Painter et al. |
| 3,287,390 | A | 11/1966 | Poos et al. |
| 3,288,854 | A | 11/1966 | Martin |
| 3,312,741 | A | 4/1967 | Martin |
| 3,313,777 | A | 4/1967 | Elam et al. |
| 3,317,466 | A | 5/1967 | Caldwell et al. |
| 3,329,722 | A | 7/1967 | Rylander |
| 3,360,547 | A | 12/1967 | Wilson et al. |
| 3,366,689 | A | 1/1968 | Maeda et al. |
| 3,386,935 | A | 6/1968 | Jackson et al. |
| 3,403,181 | A | 9/1968 | Painter et al. |
| T858,012 | I4 | 1/1969 | Caldwell et al. |
| 3,484,339 | A | 12/1969 | Caldwell |
| 3,502,620 | A | 3/1970 | Caldwell |
| T873,016 | I4 | 4/1970 | Gilkey et al. |
| 3,541,059 | A | 11/1970 | Schaper |
| 3,546,177 | A | 12/1970 | Kibler et al. |
| 3,629,202 | A | 12/1971 | Gilkey et al. |
| RE27,682 | E | 6/1973 | Schnell et al. |
| 3,772,405 | A | 11/1973 | Hamb |
| 3,799,953 | A | 3/1974 | Freitag et al. |
| 3,907,754 | A | 9/1975 | Tershansy et al. |
| 3,915,913 | A | 10/1975 | Jackson, Jr. et al. |
| 3,962,189 | A | 6/1976 | Russin et al. |
| 4,001,184 | A | 1/1977 | Scott |
| 4,010,145 | A | 3/1977 | Russin et al. |
| 4,046,933 | A | 9/1977 | Stefanik |
| 4,056,504 | A | 11/1977 | Grundmeier et al. |
| 4,084,889 | A | 4/1978 | Vischer, Jr. |
| 4,125,572 | A | 11/1978 | Scott |
| 4,156,069 | A | 5/1979 | Prevorsek et al. |
| 4,160,383 | A | 7/1979 | Rauschenberger |
| 4,185,009 | A | 1/1980 | Idel et al. |
| 4,188,314 | A | 2/1980 | Fox et al. |
| 4,194,038 | A | 3/1980 | Baker et al. |
| 4,263,364 | A | 4/1981 | Seymour et al. |
| 4,356,299 | A | 10/1982 | Cholod et al. |
| 4,367,186 | A | 1/1983 | Adelmann et al. |
| 4,379,802 | A | 4/1983 | Weaver et al. |
| 4,384,106 | A | 5/1983 | Go et al. |
| 4,391,954 | A | 7/1983 | Scott |
| 4,424,140 | A | 1/1984 | Weinberg et al. |
| 4,426,512 | A | 1/1984 | Barbee et al. |
| 4,427,614 | A | 1/1984 | Barham et al. |

(Continued)

FOREIGN PATENT DOCUMENTS

BE 615850 4/1962

(Continued)

OTHER PUBLICATIONS

New Copending U.S. Appl. No. 12/724,492, filed Mar. 16, 2010, Emmett Dudley Crawford, et al.
New Copending U.S. Appl. No. 12/724,480, filed Mar. 16, 2010, Emmett Dudley Crawford, et al.
New Copending U.S. Appl. No. 12/724,468, filed Mar. 16, 2010, Emmett Dudley Crawford, et al.
Copending U.S. Appl. No. 12/639,324, filed Dec. 16, 2009, Wesley Raymond Hale, et al.
Copending U.S. Appl. No. 12/784,193, filed May 20, 2010, Emmett Dudley Crawford, et al.
Abstract of U.S. Defense Publication T869,015, 869 O.G. 714, Dec. 16, 1969.
Abstract of U.S. Defense Publication T875,010, 875 O.G. 342, Jun. 9, 1970.

(Continued)

Primary Examiner — Alicia Toscano
(74) Attorney, Agent, or Firm — B. J. Boshears; Louis N. Moreno

(57) ABSTRACT

Polymer blends comprising polyesters made from terephthalic acid; 2,2,4,4-tetramethyl-1,3-cyclobutanediol; and 1,4-cyclohexanedimethanol, and copolymers made from acrylonitrile, butadiene, and styrene (ABS) monomers. These blends have a combination of toughness, heat resistance, high modulus, and good flowability—making them particularly useful in films, fibers, engineering molding plastics, and packaging.

10 Claims, No Drawings

U.S. PATENT DOCUMENTS

| | | |
|---|---|---|
| 4,430,484 A | 2/1984 | Quinn |
| 4,431,793 A | 2/1984 | Rosenquist |
| 4,452,933 A | 6/1984 | McCready |
| 4,465,820 A | 8/1984 | Miller et al. |
| 4,469,861 A | 9/1984 | Mark et al. |
| 4,480,086 A | 10/1984 | O'Neill |
| 4,525,504 A | 6/1985 | Morris et al. |
| 4,578,295 A | 3/1986 | Jabarin |
| 4,578,437 A | 3/1986 | Light et al. |
| 4,642,959 A | 2/1987 | Swiech, Jr. et al. |
| 4,738,880 A | 4/1988 | Asada et al. |
| 4,749,773 A | 6/1988 | Weaver et al. |
| 4,786,692 A | 11/1988 | Allen et al. |
| 4,816,308 A | 3/1989 | Shimizu et al. |
| 4,826,903 A | 5/1989 | Weaver et al. |
| 4,845,188 A | 7/1989 | Weaver et al. |
| 4,880,592 A | 11/1989 | Martini et al. |
| 4,882,412 A | 11/1989 | Weaver et al. |
| 4,892,922 A | 1/1990 | Weaver et al. |
| 4,892,923 A | 1/1990 | Weaver et al. |
| 4,937,134 A | 6/1990 | Schrenk et al. |
| 4,939,186 A | 7/1990 | Nelson et al. |
| 4,976,057 A | 12/1990 | Bianchi |
| 4,981,898 A | 1/1991 | Bassett |
| 4,985,342 A | 1/1991 | Muramoto et al. |
| 5,017,679 A | 5/1991 | Chang et al. |
| 5,017,680 A | 5/1991 | Sublett |
| 5,034,252 A | 7/1991 | Nilsson et al. |
| 5,104,450 A | 4/1992 | Sand et al. |
| 5,118,760 A | 6/1992 | Blakely et al. |
| 5,118,847 A | 6/1992 | Jackson et al. |
| 5,142,088 A | 8/1992 | Phelps et al. |
| 5,169,994 A | 12/1992 | Sumner, Jr. et al. |
| 5,183,863 A | 2/1993 | Nakamura et al. |
| 5,191,038 A | 3/1993 | Krabbenhoft et al. |
| 5,207,967 A | 5/1993 | Small et al. |
| 5,219,510 A | 6/1993 | Machell et al. |
| 5,224,958 A | 7/1993 | Warunek et al. |
| 5,239,020 A | 8/1993 | Morris |
| 5,256,761 A | 10/1993 | Blount, Jr. |
| 5,258,556 A | 11/1993 | Sumner, Jr. et al. |
| 5,268,219 A | 12/1993 | Harada et al. |
| 5,288,715 A | 2/1994 | Machell et al. |
| 5,288,764 A | 2/1994 | Rotter et al. |
| 5,292,783 A | 3/1994 | Buchanan et al. |
| 5,310,611 A | 5/1994 | Okabe et al. |
| 5,310,787 A | 5/1994 | Kutsuwa et al. |
| 5,326,584 A | 7/1994 | Kamel et al. |
| 5,331,034 A | 7/1994 | Pfahler et al. |
| 5,333,073 A | 7/1994 | Suzuki |
| 5,354,791 A | 10/1994 | Gallucci |
| 5,372,864 A | 12/1994 | Weaver et al. |
| 5,372,879 A | 12/1994 | Handa et al. |
| 5,378,796 A | 1/1995 | George et al. |
| 5,382,292 A | 1/1995 | Conroy et al. |
| 5,384,377 A | 1/1995 | Weaver et al. |
| 5,475,144 A | 12/1995 | Watson et al. |
| 5,480,926 A | 1/1996 | Fagerburg et al. |
| 5,486,562 A | 1/1996 | Borman et al. |
| 5,489,665 A | 2/1996 | Yamato et al. |
| 5,494,992 A | 2/1996 | Kanno et al. |
| 5,498,668 A | 3/1996 | Scott |
| 5,498,688 A | 3/1996 | Oshino et al. |
| 5,506,014 A | 4/1996 | Minnick |
| 5,523,382 A | 6/1996 | Beavers et al. |
| 5,534,609 A | 7/1996 | Lewis et al. |
| 5,552,512 A | 9/1996 | Sublett |
| 5,591,530 A | 1/1997 | Warner et al. |
| 5,633,340 A | 5/1997 | Hoffman et al. |
| 5,650,453 A | 7/1997 | Eckberg et al. |
| 5,654,347 A | 8/1997 | Khemani et al. |
| 5,656,715 A | 8/1997 | Dickerson et al. |
| 5,668,243 A | 9/1997 | Yau et al. |
| 5,681,918 A | 10/1997 | Adams et al. |
| 5,688,874 A | 11/1997 | Hoffman |
| 5,696,176 A | 12/1997 | Khemani et al. |
| 5,705,575 A | 1/1998 | Kelsey |
| 5,783,307 A | 7/1998 | Fagerburg et al. |
| 5,804,617 A | 9/1998 | Hoffman et al. |
| 5,814,679 A | 9/1998 | Eckberg et al. |
| 5,859,116 A | 1/1999 | Shih |
| 5,863,622 A | 1/1999 | Jester |
| 5,902,631 A | 5/1999 | Wang et al. |
| 5,907,026 A | 5/1999 | Factor et al. |
| 5,942,585 A | 8/1999 | Scott et al. |
| 5,955,565 A | 9/1999 | Morris et al. |
| 5,958,539 A | 9/1999 | Eckart et al. |
| 5,958,581 A | 9/1999 | Khanarian et al. |
| 5,959,066 A | 9/1999 | Charbonneau et al. |
| 5,962,625 A | 10/1999 | Yau |
| 5,977,347 A | 11/1999 | Shuto et al. |
| 5,989,663 A | 11/1999 | Morris et al. |
| 6,001,910 A | 12/1999 | Blumenthal et al. |
| 6,005,059 A | 12/1999 | Scott et al. |
| 6,011,124 A | 1/2000 | Scott et al. |
| 6,012,597 A | 1/2000 | Nishihara et al. |
| 6,022,603 A | 2/2000 | Umeda et al. |
| 6,025,061 A | 2/2000 | Khanarian et al. |
| 6,030,671 A | 2/2000 | Yang et al. |
| 6,037,424 A | 3/2000 | Scott et al. |
| 6,043,322 A | 3/2000 | Scott et al. |
| 6,044,996 A | 4/2000 | Carew et al. |
| 6,063,464 A | 5/2000 | Charbonneau et al. |
| 6,063,465 A | 5/2000 | Charbonneau et al. |
| 6,063,495 A | 5/2000 | Charbonneau et al. |
| 6,084,019 A | 7/2000 | Matayabas, Jr. et al. |
| 6,096,854 A | 8/2000 | Morris et al. |
| 6,114,575 A | 9/2000 | McMahon et al. |
| 6,120,477 A | 9/2000 | Campbell et al. |
| 6,120,889 A | 9/2000 | Turner et al. |
| 6,126,992 A | 10/2000 | Khanarian et al. |
| 6,127,492 A | 10/2000 | Nagashima et al. |
| 6,146,228 A | 11/2000 | Mougin et al. |
| 6,150,494 A | 11/2000 | Wang et al. |
| 6,183,848 B1 | 2/2001 | Turner et al. |
| 6,191,209 B1 | 2/2001 | Andrews et al. |
| 6,211,309 B1 | 4/2001 | McIntosh et al. |
| 6,221,556 B1 | 4/2001 | Gallucci et al. |
| 6,225,436 B1 | 5/2001 | Eiffler et al. |
| 6,232,504 B1 | 5/2001 | Barteau et al. |
| 6,239,910 B1 | 5/2001 | Digert |
| 6,255,523 B1 | 7/2001 | Panandiker et al. |
| 6,287,656 B1 | 9/2001 | Turner et al. |
| 6,307,006 B1 | 10/2001 | Konig et al. |
| 6,309,718 B1 | 10/2001 | Sprayberry |
| 6,320,042 B1 | 11/2001 | Michihata et al. |
| 6,323,291 B1 | 11/2001 | Mason et al. |
| 6,323,304 B1 | 11/2001 | Lemmon et al. |
| 6,342,304 B1 | 1/2002 | Buchanan et al. |
| 6,352,783 B1 | 3/2002 | Fagerburg |
| 6,354,986 B1 | 3/2002 | Hlavinka et al. |
| 6,359,070 B1 | 3/2002 | Khanarian et al. |
| 6,406,792 B1 | 6/2002 | Briquet et al. |
| 6,437,083 B1 | 8/2002 | Brack et al. |
| 6,448,334 B1 | 9/2002 | Verhoogt et al. |
| 6,458,468 B1 | 10/2002 | Moskala et al. |
| 6,504,002 B1 | 1/2003 | Karlik et al. |
| 6,559,272 B1 | 5/2003 | Jeon et al. |
| 6,573,328 B2 | 6/2003 | Kropp et al. |
| 6,599,994 B2 | 7/2003 | Shelby et al. |
| 6,639,067 B1 | 10/2003 | Brinegar et al. |
| 6,656,577 B1 | 12/2003 | Adelman et al. |
| 6,669,980 B2 | 12/2003 | Hansen |
| 6,723,768 B2 | 4/2004 | Adams et al. |
| 6,733,716 B2 | 5/2004 | Belcher |
| 6,740,377 B2 | 5/2004 | Pecorini et al. |
| 6,773,653 B2 | 8/2004 | Miller et al. |
| 6,818,293 B1 | 11/2004 | Keep et al. |
| 6,818,730 B2 | 11/2004 | Brandenburg et al. |
| 6,846,440 B2 | 1/2005 | Flynn et al. |
| 6,846,508 B1 | 1/2005 | Colas et al. |
| 6,896,966 B2 | 5/2005 | Crawford et al. |
| 6,908,650 B2 | 6/2005 | Odorisio et al. |
| 6,914,120 B2 | 7/2005 | Germroth et al. |
| 7,037,576 B2 | 5/2006 | Willham et al. |
| 7,048,978 B2 | 5/2006 | Tanaka et al. |
| 7,053,143 B2 | 5/2006 | Mori et al. |

| | | | | | | |
|---|---|---|---|---|---|---|
| 7,122,661 B2 | 10/2006 | Fleche et al. | | EP | 0 372 846 | 6/1990 |
| 7,169,880 B2 | 1/2007 | Shelby et al. | | EP | 0 544 008 A1 | 6/1993 |
| 7,297,755 B2 | 11/2007 | Shelby et al. | | EP | 0 595 413 A1 | 5/1994 |
| 7,354,628 B2 | 4/2008 | Steube | | EP | 0 698 631 | 2/1996 |
| 7,375,154 B2 | 5/2008 | Stafford et al. | | EP | 0 714 764 A2 | 6/1996 |
| 7,427,430 B2 | 9/2008 | Rhee et al. | | EP | 0 902 052 A1 | 3/1999 |
| 7,468,409 B2 | 12/2008 | Pearson et al. | | EP | 0 930 531 A1 | 7/1999 |
| 7,482,397 B2 | 1/2009 | Pearson et al. | | EP | 1 035 167 A | 9/2000 |
| 2001/0029324 A1 | 10/2001 | Walker et al. | | EP | 1 066 825 A1 | 1/2001 |
| 2001/0031805 A1 | 10/2001 | Buhler | | EP | 1 674 496 A1 | 6/2006 |
| 2001/0034419 A1 | 10/2001 | Kanayama et al. | | FR | 1432471 | 2/1966 |
| 2001/0044003 A1 | 11/2001 | Gallucci et al. | | FR | 1434658 | 2/1966 |
| 2002/0055586 A1 | 5/2002 | Dalgewicz, III et al. | | GB | 962913 | 7/1964 |
| 2002/0128357 A1 | 9/2002 | Goossens et al. | | GB | 1041651 | 9/1966 |
| 2002/0132963 A1 | 9/2002 | Quillen | | GB | 1044015 | 9/1966 |
| 2002/0137856 A1 | 9/2002 | Andrews et al. | | GB | 1047043 | 11/1966 |
| 2002/0188092 A1 | 12/2002 | Moskala et al. | | GB | 1090241 | 11/1967 |
| 2002/0198297 A1 | 12/2002 | Odorisio et al. | | GB | 1130558 | 10/1968 |
| 2003/0032737 A1 | 2/2003 | Andrews et al. | | GB | 1278284 | 6/1972 |
| 2003/0060546 A1 | 3/2003 | Moskala et al. | | GB | 1364732 | 8/1974 |
| 2003/0075516 A1 | 4/2003 | Rothman et al. | | GB | 2216919 A | 10/1989 |
| 2003/0077546 A1 | 4/2003 | Donovan et al. | | JP | 5688440 A | 12/1979 |
| 2003/0135015 A1 | 7/2003 | Fujimaki et al. | | JP | 03207743 | 9/1991 |
| 2003/0139497 A1 | 7/2003 | Odorisio et al. | | JP | 65-01040 | 2/1994 |
| 2003/0149177 A1 | 8/2003 | Andrews et al. | | JP | 959371 A | 4/1997 |
| 2003/0169514 A1 | 9/2003 | Bourdelais et al. | | JP | 2001-066701 | 8/1999 |
| 2003/0187151 A1 | 10/2003 | Adams et al. | | JP | 11222516 | 8/1999 |
| 2003/0195295 A1 | 10/2003 | Mahood et al. | | JP | 2000-352620 A | 12/2000 |
| 2003/0221716 A1 | 12/2003 | Olson | | JP | 2001-098086 | 4/2001 |
| 2003/0229181 A1 | 12/2003 | Hariharan et al. | | JP | 2001-214049 | 8/2001 |
| 2004/0022526 A1 | 2/2004 | Kuno et al. | | JP | 2003292593 A | 10/2003 |
| 2004/0063864 A1 | 4/2004 | Adams et al. | | JP | 2004-058565 A | 2/2004 |
| 2004/0101687 A1 | 5/2004 | Crawford et al. | | JP | 2004-066624 A | 3/2004 |
| 2004/0106707 A1 | 6/2004 | Su et al. | | JP | 2004-067973 A | 3/2004 |
| 2004/0106767 A1 | 6/2004 | Simon et al. | | JP | 2004-244497 A | 9/2004 |
| 2004/0108623 A1 | 6/2004 | Deeter et al. | | JP | 2004-292558 A | 10/2004 |
| 2004/0138381 A1 | 7/2004 | Blasius et al. | | JP | 2005-254757 A | 9/2005 |
| 2004/0145700 A1 | 7/2004 | Miniutti et al. | | JP | 2007-069914 A | 3/2007 |
| 2004/0164279 A1 | 8/2004 | Stevenson et al. | | JP | 2007-253491 A | 10/2007 |
| 2004/0202822 A1 | 10/2004 | Bourdelais et al. | | KR | 2003-054611 | 7/2003 |
| 2004/0214984 A1 | 10/2004 | Keep et al. | | WO | WO 97-01118 | 1/1997 |
| 2005/0008885 A1 | 1/2005 | Blakely et al. | | WO | WO 01-06981 | 2/2001 |
| 2005/0072060 A1 | 4/2005 | Moncho et al. | | WO | WO 01-85824 A2 | 11/2001 |
| 2005/0075466 A1 | 4/2005 | Oguro et al. | | WO | WO 02-055570 A1 | 7/2002 |
| 2005/0096453 A1 | 5/2005 | Flynn et al. | | WO | WO 02-059207 | 8/2002 |
| 2005/0101759 A1 | 5/2005 | Odorisio et al. | | WO | 2004009146 A1 | 1/2004 |
| 2005/0113556 A1 | 5/2005 | Strand et al. | | WO | WO 2004-039860 | 5/2004 |
| 2005/0119359 A1 | 6/2005 | Shelby et al. | | WO | WO 2004-104077 A1 | 12/2004 |
| 2005/0124779 A1 | 6/2005 | Shelby et al. | | WO | WO 2004-106988 A2 | 12/2004 |
| 2005/0181155 A1 | 8/2005 | Share et al. | | WO | WO 2005-007735 A2 | 1/2005 |
| 2005/0209435 A1 | 9/2005 | Hirokane et al. | | WO | WO 2005-026241 A1 | 3/2005 |
| 2006/0004151 A1 | 1/2006 | Shaikh et al. | | WO | WO 2006-025827 | 3/2006 |
| 2006/0036012 A1 | 2/2006 | Hayes et al. | | WO | WO 2006-127755 A2 | 11/2006 |
| 2006/0094858 A1 | 5/2006 | Turner et al. | | WO | WO 2006-127831 A1 | 11/2006 |
| 2006/0111481 A1 | 5/2006 | Pearson et al. | | WO | WO 2007-053434 A1 | 5/2007 |
| 2006/0111519 A1 | 5/2006 | Strand et al. | | WO | WO 2007-053548 A2 | 5/2007 |
| 2006/0135668 A1 | 6/2006 | Hayes | | WO | WO 2007-053549 A1 | 5/2007 |
| 2006/0146228 A1 | 7/2006 | Sogo et al. | | WO | WO 2007-053550 | 5/2007 |
| 2006/0151907 A1 | 7/2006 | Kashiwabara et al. | | | | |
| 2006/0180560 A1 | 8/2006 | Robinson | | | | |
| 2006/0197246 A1 | 9/2006 | Hale et al. | | | | |
| 2006/0199904 A1 | 9/2006 | Hale et al. | | | | |
| 2006/0199919 A1 | 9/2006 | Hale et al. | | | | |
| 2006/0228507 A1 | 10/2006 | Hale et al. | | | | |
| 2006/0234073 A1 | 10/2006 | Hale et al. | | | | |
| 2006/0235167 A1 | 10/2006 | Hale et al. | | | | |
| 2006/0247388 A1 | 11/2006 | Hale et al. | | | | |
| 2006/0270773 A1 | 11/2006 | Hale et al. | | | | |
| 2006/0270806 A1 | 11/2006 | Hale | | | | |
| 2006/0286332 A1* | 12/2006 | Crawford et al. ......... 428/36.92 | | | | |
| 2007/0049667 A1* | 3/2007 | Kim et al. ................. 524/127 | | | | |
| 2007/0071930 A1 | 3/2007 | Shelby et al. | | | | |

FOREIGN PATENT DOCUMENTS

| | | |
|---|---|---|
| CA | 2035149 | 8/1991 |
| DE | 197 27 709 | 6/1997 |
| EP | 0 039 838 A1 | 11/1981 |
| EP | 0 273 144 | 5/1987 |
| EP | 0 282 277 | 9/1988 |

OTHER PUBLICATIONS

Chen et al., "The molecular basis for the relationship between the secondary relaxation and mechanical properties of a series of polyester copolymer glasses," Marcromolecules, 32:5944-5955 (1999).

Coover, H. et al., "Copolyester Molding Compositions," Chemical Abstracts Service, XP002391844.

Kelsey, E. et al., "High Impact, Amorphous Terephthalate Copolyesters of Rigid 2,2,4,4-Tetramethyl-1,3-cyclobutanediol with Flexible Diols," Macromolecules vol. 33, 2000, pp. 5810-5818, American Chemical Society.

"Plastic Additives Handbook," 5th Edition, 2001, pp. 98-108 and pp. 109-112 (Hanser Gardner Publications, Inc., Cincinnati, OH.

Bergen, R. L., Jr., "Stress Cracking of Rigid Thermoplastics," SPE Journal, Jun. 1962.

Scheirs, John, et al., "Modern Polyesters: Chemistry and Technology of Polyesters and Copolyesters," Technology & Engineering, 2003, pg. 287.

English language Abstract of JP 02-305816 from Patent Abstracts of Japan, Dec. 19, 1990.

U.S. Appl. No. 11/390,555, filed Mar. 28, 2006, Emmett Dudley Crawford, et al.
U.S. Appl. No. 11/390,563, filed Mar. 28, 2006, Emmett Dudley Crawford, et al.
U.S. Appl. No. 11/390,629, filed Mar. 28, 2006, Emmett Dudley Crawford, et al.
U.S. Appl. No. 11/390,630, filed Mar. 28, 2006, Emmett Dudley Crawford, et al.
U.S. Appl. No. 11/390,631, filed Mar. 28, 2006, Emmett Dudley Crawford, et al.
U.S. Appl. No. 11/390,654, filed Mar. 28, 2006, Emmett Dudley Crawford, et al.
U.S. Appl. No. 11/390,655, filed Mar. 28, 2006, Emmett Dudley Crawford, et al.
U.S. Appl. No. 11/390,671, filed Mar. 28, 2006, Emmett Dudley Crawford, et al.
U.S. Appl. No. 11/390,672, filed Mar. 28, 2006, Emmett Dudley Crawford, et al.
U.S. Appl. No. 11/390,722, filed Mar. 28, 2006, Emmett Dudley Crawford, et al.
U.S. Appl. No. 11/390,750, filed Mar. 28, 2006, Emmett Dudley Crawford, et al.
U.S. Appl. No. 11/390,751, filed Mar. 28, 2006, Emmett Dudley Crawford, et al.
U.S. Appl. No. 11/390,752, filed Mar. 28, 2006, Emmett Dudley Crawford, et al.
U.S. Appl. No. 11/390,773, filed Mar. 28, 2006, Emmett Dudley Crawford, et al.
U.S. Appl. No. 11/390,793, filed Mar. 28, 2006, Emmett Dudley Crawford, et al.
U.S. Appl. No. 11/390,794, filed Mar. 28, 2006, Emmett Dudley Crawford, et al.
U.S. Appl. No. 11/390,809, filed Mar. 28, 2006, Wesley Raymond Hale, et al.
U.S. Appl. No. 11/390,811, filed Mar. 28, 2006, Emmett Dudley Crawford, et al.
U.S. Appl. No. 11/390,812, filed Mar. 28, 2006, Wesley Raymond Hale, et al.
U.S. Appl. No. 11/390,814, filed Mar. 28, 2006, Emmett Dudley Crawford, et al.
U.S. Appl. No. 11/390,826, filed Mar. 28, 2006, Emmett Dudley Crawford, et al.
U.S. Appl. No. 11/390,827, filed Mar. 28, 2006, Emmett Dudley Crawford, et al.
U.S. Appl. No. 11/390,836, filed Mar. 28, 2006, Emmett Dudley Crawford, et al.
U.S. Appl. No. 11/390,846, filed Mar. 28, 2006, Wesley Raymond Hale, et al.
U.S. Appl. No. 11/390,847, filed Mar. 28, 2006, Emmett Dudley Crawford, et al.
U.S. Appl. No. 11/390,853, filed Mar. 28, 2006, Emmett Dudley Crawford, et al.
U.S. Appl. No. 11/390,858, filed Mar. 28, 2006, Emmett Dudley Crawford, et al.
U.S. Appl. No. 11/390,864, filed Mar. 28, 2006, Wesley Raymond Hale, et al.
U.S. Appl. No. 11/390,865, filed Mar. 28, 2006, Emmett Dudley Crawford, et al.
U.S. Appl. No. 11/390,882, filed Mar. 28, 2006, Emmett Dudley Crawford, et al.
U.S. Appl. No. 11/390,883, filed Mar. 28, 2006, Thomas Joseph Pecorini, et al.
U.S. Appl. No. 11/390,908, filed Mar. 28, 2006, Wesley Raymond Hale, et al.
U.S. Appl. No. 11/391,063, filed Mar. 28, 2006, Emmett Dudley Crawford, et al.
U.S. Appl. No. 11/391,124, filed Mar. 28, 2006, Wesley Raymond Hale, et al.
U.S. Appl. No. 11/391,125, filed Mar. 28, 2006, Emmett Dudley Crawford, et al.
U.S. Appl. No. 11/391,137, filed Mar. 28, 2006, Emmett Dudley Crawford, et al.
U.S. Appl. No. 11/391,156, filed Mar. 28, 2006, Emmett Dudley Crawford, et al.
U.S. Appl. No. 11/391,485, filed Mar. 28, 2006, Emmett Dudley Crawford, et al.
U.S. Appl. No. 11/391,495, filed Mar. 28, 2006, Emmett Dudley Crawford, et al.
U.S. Appl. No. 11/391,505, filed Mar. 28, 2006, Emmett Dudley Crawford, et al.
U.S. Appl. No. 11/391,565, filed Mar. 28, 2006, Emmett Dudley Crawford, et al.
U.S. Appl. No. 11/391,571, filed Mar. 28, 2006, Emmett Dudley Crawford, et al.
U.S. Appl. No. 11/391,576, filed Mar. 28, 2006, Emmett Dudley Crawford, et al.
U.S. Appl. No. 11/391,642, filed Mar. 28, 2006, Emmett Dudley Crawford, et al.
U.S. Appl. No. 11/391,659, filed Mar. 28, 2006, Emmett Dudley Crawford, et al.
U.S. Appl. No. 11/588,524, filed Oct. 27, 2006, Emmett Dudley Crawford, et al.
U.S. Appl. No. 11/588,458, filed Oct. 27, 2006, Emmett Dudley Crawford, et al.
U.S. Appl. No. 11/588,907, filed Oct. 27, 2006, Emmett Dudley Crawford, et al.
U.S. Appl. No. 11/588,527, filed Oct. 27, 2006, Emmett Dudley Crawford, et al.
U.S. Appl. No. 11/588,906, filed Oct. 27, 2006, Ted Calvin Germroth, et al.
U.S. Appl. No. 11/588,883, filed Oct. 27, 2006, Ted Calvin Germroth, et al.
U.S. Appl. No. 11/588,554, filed Oct. 27, 2006, Emmett Dudley Crawford, et al.
U.S. Appl. No. 11/635,434, filed Dec. 7, 2006, Emmett Dudley Crawford.
U.S. Appl. No. 11/635,433, filed Dec. 7, 2006, Emmett Dudley Crawford.
U.S. Appl. No. 11/439,062, filed May 23, 2006, Wesley Raymond Hale, et al.
U.S. Appl. No. 11/439,340, filed May 23, 2006, Wesley Raymond Hale.
U.S. Appl. No. 11/706,476, filed Feb. 14, 2007, Leslie Shane Moody, et al.
U.S. Appl. No. 11/706,791, filed Feb. 14, 2007, Leslie Shane Moody, et al.
U.S. Appl. No. 11/827,696, filed Jul. 13, 2007, Ryan Thomas Neill, et al.
U.S. Appl. No. 12/091,568, filed Apr. 25, 2008, Emmett Dudley Crawford, et al.
U.S. Appl. No. 12/091,566, filed Apr. 25, 2008, Emmett Dudley Crawford, et al.
U.S. Appl. No. 12/091,570, filed Apr. 25, 2008, Ted Calvin Germroth, et al.
U.S. Appl. No. 12/091,572, filed Apr. 25, 2008, Ted Calvin Germroth, et al.
U.S. Appl. No. 12/294,690, filed Sep. 26, 2008, Ted Calvin Germroth et al.
U.S. Appl. No. 12/294,686, filed Sep. 26, 2008, Ted Calvin Germroth et al.
U.S. Appl. No. 12/274,692, filed Nov. 20, 2008, Thomas Joseph Pecorini et al.
U.S. Appl. No. 12/338,453, filed Dec. 18, 2008, Emmett Dudley Crawford, et al.
U.S. Appl. No. 12/361,779, filed Jan. 29, 2009, Emmett Dudley Crawford.
U.S. Appl. No. 12/365,515, filed Feb. 4, 2009, Emmett Dudley Crawford.
Chapter 4—*Processing of Plastics in "Plastics Engineering, 3$^{rd}$ ed"*, R.J. Crawford, Butterworth-Heinemann Publisher, 1998, Oxford, England, pp. 245-342.
Fox equation (T.G. Fox, Session J, Bull. Am. Phys. Soc., 1, 123 (1956)).

*The Technology of Plasticizers*, by J. Kern Sears and Joseph R Darby, published by Society of Plastic Engineers-Wiley and Sons, New York, 1982; pp. 136-139.
Coleman et al., "Polymer Reviews—A Practical Guide to Polymer Miscibility," *Polymer 31*, pp. 1187-1203 (1990).
"*Hansen Solubility Parameters, a Users Handbook*", by Charles M. Hansen, Chapter 1, CRC Press, 2000, pp. 1-24.
Martinez et al., "*Phase Behavior and Mechanical Properties of Injection Molded Poly (Ethylene Terephthalate)—Polyarylate Blends*"; Journal of Applied Polymer Science, John Wiley and Sons Inc. New York, US, vol. 45, No. 7, Jul. 5, 1992, p. 1135-1143.
Won Ho Jo et al. : :*Miscibility of poly(ether imide)-poly(ethylene terephthalate) blends*; Polymer Bulletin, Springer, Heidelberg, DE, vol. 33, No. 1, Jun. 1, 1994, p. 113-118 (1994).
Anonymous: "*Poly (ethylene naphthalenedicarboxylate)-polyetherimide blends*" Research Disclosure, Mason Publications, Hampshire, GB, vol. 283, No. 38, Nov. 1987.
ASTM D1525-06, *Standard Test Method for Vicat Softening Temperature of Plastics*, Mar. 15, 2006.
ASTM D648-06, *Standard Test Method for Deflection Temperature of Plastics Under Flexural Load in the Edgewise Position*, Mar. 15, 2006.
ASTM D790-03, *Standard Test Methods for Flexural Properties of Unreinforced and Reinforced Plastics and Electrical Insulating Materials*, Mar. 10, 2003.
ASTM D638-03, *Standard Test Method for Tensile Properties of Plastics*, Dec. 1, 2003.
ASTM D3418-03, *Transition Temperatures and Enthalpies of Fusion and Crystallization of Polymers by Differential Scanning Calorimetry*, Dec. 1, 2003.
Database WPI, Section Ch, Week 200536, Derwent Publications Ltd., London, GB; Class A23, AN 2005-355258, XP002396922 & WO 2005-030833 A1 (Kanebo Ltd) Apr. 7, 2005 abstract.
Shearer, N.H., "T18-Type 1 Polyesters," Mar. 1966, SPE Annual Technical Conference and Exhibition, XP009080224.
Chang, S. et al., "Effect of Stabilizers on the Preparation of Poly(ethylene Terephthalate)", Journal of Polymer Science, Polymer Chemistry Edition, 1982, vol. 20, pp. 2053-2061, John Wiley & Sons, Inc.
Copending U.S Appl. No. 12/254,894, filed Oct. 21, 2008, Gary Michael Stack, et al.
Dixon, E.R. et al., "The Inter-Relation of Some Mechanical Properties with Molecular Weight and Crystallinity in Poly(ethylene terephthalate)", 1968, pp. 464-470, Journal of Materials Science, vol. 3.
New Copending U.S. Appl. No. 12/479,893, filed Jun. 8, 2009, Emmett Dudley Crawford, et al.
Buschow, K.H.J. et al., "Packaging: Polymers for Containers," Encyclopedia of Materials: Science and Technology, 2001, vol. 8, pp. 6646-6652, El Sevier.
Coles, Richard, et al., Food Packaging Technology, 2003, pp. 194-195 and 224-229, Blackwell Publishing.
Sajiki and Yonekubo, "Leaching of Bisphenol A (BPA) to Seawater from Polycarbonate Plastic and its Degradation by Reactive Oxygen Species," 2003, Chemosphere, 51, pp. 55-62.
Ellis, Thomas S., "Miscibility of Polyamide Blends: Effects of Configuration," Polymer, vol. 36, Issue 20, 1995, pp. 3919-3926.
Gupta, V.B. et al., "PET Fibers, Films, and Bottles: Section 5-7", Handbook of Thermoplastic Polyesters: Homopolymers, Copolymers, Blends, and Composites, 2005, pp. 362-388, Wiley InterScience.
Turner, S.R., et al., "Amorphous and Crystalline Polyesters based on 1,4-Cyclohexanedimethanol", Chapter 7, Modern Polyesters: Chemistry and Technology of Polyesters and Copolyesters, Edited by J. Sheirs and T.E. Long, 2003 John Wiley & Sons, Ltd., pp. 267-292.
Zipper, Marcus D. et al., "A Free Volume Study of Miscible Polyester Blends," 1995, Polymer International, vol. 36, pp. 127-136.
"APEC High-Heat Polycarbonate Resin," 2004, Bayer Material Science Product Information; Not Prior Art, Submitted for State of the Art.
Lobo, Hubert et al, "Handbook of Plastics Analysis," 2003, pp. 20 and 21, Marcel Dekker, Inc.
USPTO Notice of Allowance dated Jan. 27, 2010 for copending U.S. Appl. No. 11/635,434.
USPTO Notice of Allowance dated Jun. 24, 2010 for copending U.S. Appl. No. 11/391,576.
USPTO Office Action dated Jun. 24, 2010 for copending U.S. Appl. No. 11/390,846.
USPTO Office Action dated Jul. 8, 2010 for copending U.S. Appl. No. 11/390,809.
USPTO Notice of Allowance dated Jul. 8, 2010 for copending U.S. Appl. No. 11/390,630.
USPTO Notice of Allowance dated Jul. 8, 2010 for copending U.S. Appl. No. 11/390,883.
USPTO Office Action dated Jul. 12, 2010 for copending U.S. Appl. No. 11/390,794.
Notice of Allowance dated Jul. 13, 2010 for copending U.S. Appl. No. 11/391,505.
USPTO Office Action dated Jul. 22, 2010 for copending U.S. Appl. 12/479,893.
USPTO Notice of Allowance dated Jul. 22, 2010 for copending U.S. Appl. No. 11/391,485.
USPTO Notice of Allowance dated Aug. 3, 2010 for copending U.S. Appl. No. 11/390,864.
USPTO Office Action dated Aug. 6, 2010 for copending U.S. Appl. No. 11/773,275.
New copending U.S. Appl. No. 12/853,717, filed on Aug. 10, 2010, Emmett Dudley Crawford, et al.
USPTO Notice of Allowance dated Aug. 11, 2010 for copending U.S. Appl. No. 11/390,631.
USPTO Notice of Allowance dated Sep. 2, 2010 for copending U.S. Appl. No. 11/390,811.
USPTO Office Action dated Sep. 2, 2010 for copending U.S. Appl. No. 11/391,124.
New copending U.S. Appl. No. 12/888,648, filed on Sep. 23, 2010, Thomas Joseph Pecorini et al.
USPTO Office Action dated Oct. 5, 2010 for copending U.S. Appl. No. 11/390,655.
New copending U.S. Appl. No. 12/900,060, filed on Oct. 7, 2010, Thomas Joseph Pecorini, et al.
USPTO Office Action dated Oct. 8, 2010 for copending U.S. Appl. No. 11/390,812.
USPTO Notice of Allowance dated Oct. 28, 2010 for copending U.S. Appl. No. 11/390,827.
USPTO Office Action dated Oct. 27, 2010 for copending U.S. Appl. No. 12/294,690
USPTO Notice of Allowance dated Oct. 14, 2010 for copending U.S. Appl. No. 11/390,722.
USPTO Notice of Allowance dated Nov. 2, 2010 for copending U.S. Appl. No. 12/724,480.
USPTO Notice of Allowance dated Nov. 4, 2010 for copending U.S. Appl. No. 12/724,468.
USPTO Notice of Allowance dated Nov. 4, 2010 for copending U.S. Appl. No. 11/390,955.
USPTO Office Action dated Nov. 4, 2010 for copending U.S. Appl. No. 12/294,686.
USPTO Notice of Allowance dated Nov. 4, 2010 for copending U.S. Appl. No. 11/390,826.
USPTO Office Action dated Oct. 27, 2010 for copending U.S. Appl. No. 11/390,836.
USPTO Notice of Allowance dated Nov. 23, 2010 for copending U.S. Appl. No. 11/390,563.
New copending U.S. Appl. No. 12/943,217, filed on Nov. 10, 2010, Emmett Dudley Crawford et al.
New copending U.S. Appl. No. 12/963,703, filed on Dec. 9, 2010.
New copending U.S. Appl. No. 12/963,698, filed on Dec. 9, 2010.
New copending U.S. Appl. No. 13/007,838 filed, on Jan. 17, 2011, Emmett Dudley Crawford et al.
USTPO Office Action dated Jan. 24, 2011 for copending U.S. Appl. No. 11/773,275.
New copending U.S. Appl. No. 13/016,147 filed, on Jan. 28, 2011, Emmett Dudley Crawford, et al.
New copending U.S. Appl. No. 13/017,069 filed on Jan. 31, 2011, Emmett Dudley Crawford, et al.
New Copending U.S. Appl. No. 13/017,352 filed, on Jan. 31, 2011, Emmett Dudley Crawford, et al.

USPTO Office Action dated Jan. 25, 2011 for copending U.S. Appl. No. 12/853,717.
Al-Malaika, S., "Stabilization", Encyclopedia of Polymer Science and Technology, vol. 4, 2001, pp. 179-229, John Wiley & Sons, Inc.
USPTO Notice of Allowance dated Jan. 26, 2011 for copending U.S. Appl. No. 11/390,858.
USPTO Office Action dated Feb. 2, 2011 for copending U.S. Appl. No. 11/390,655.
USPTO Office Action dated Mar. 17, 2011 for copending U.S. Appl. No. 12/479,893.
USPTO Notice of Allowance dated Mar. 17, 2011 for copending U.S. Appl. No. 11/391,137.
USPTO Office Action dated Feb. 14, 2011 for copending U.S. Appl. No. 12/294,690.
USPTO Notice of Allowance dated Feb. 18, 2011 for copending U.S. Appl. No. 11/390,809.
USPTO Notice of Allowance dated Feb. 17, 2011 for copending U.S. Appl. No. 11/390,812.
USPTO Office Action dated Jun. 2, 2011 for copending U.S. Appl. No. 12/338,453.
USPTO Notice of Allowance dated Aug. 12, 2011 for copending U.S. Appl. No. 11/390,752.
USPTO Office Action dated Jul. 19, 2011 for copending U.S. Appl. No. 11/390,794.
USPTO Notice of Allowance dated Jul. 21, 2011 for copending U.S. Appl. No. 11/390,671.
USPTO Notice of Allowance dated Aug. 3, 2011 for copending U.S. Appl. No. 11/390,655.
New copending U.S. Appl. No. 13/162,870, filed on Jun. 17, 2011, Emmett Dudley Crawford, et al.
USPTO Office Action dated Jul. 7, 2011 for copending U.S. Appl. No. 11/588,906.
USPTO Office Action dated Jun. 22, 2011 for copending U.S. Appl. No. 12/091,570.
USPTO Office Action dated Jun. 8, 2011 for copending U.S. Appl. No. 11/588,883.
USPTO Office Action dated Aug. 17, 2011 for copending U.S. Appl. No. 12/274,692.
New copending U.S. Appl. No. 13/215,511, filed on Aug. 23, 2011, Emmett Dudley Crawford, et al.
USPTO Office Action dated Sep. 14, 2011 for copending U.S. Appl. No. 13/017,069.
USPTO Notice of Allowance dated Sep. 16, 2011 for copending U.S. Appl. No. 11/390,671.
USPTO Notice of Allowance dated Sep. 16, 2011 for copending U.S. Appl. No. 12/784,193.
USPTO Office Action dated Oct. 17, 2011 for copending U.S. Appl. No. 12/853,717.
USPTO Notice of Allowance dated Oct. 17, 2011 for copending U.S. Appl. No. 11/390,794.
USPTO Notice of Allowance dated Oct. 25, 2011 for copending U.S. Appl. No. 12/900,060.
USTPO Office Action dated Oct. 31, 2011 for copending U.S. Appl. No. 12/639,324.
USPTO Office Action dated Nov. 2, 2011 for copending U.S. Appl. No. 12/479,893.
USPTO Notice of Allowance dated Nov. 10, 2011 for copending U.S. Appl. No. 12/943,217.
USPTO Notice of Allowance dated Nov. 28, 2011 for copending U.S. Appl. No. 12/274,692.
USPTO Office Action dated Dec. 21, 2011 for copending U.S. Appl. No. 12/091,570.
New copending U.S. Appl. No. 13/330,052, filed Dec. 19, 2011, Kenny Randolph Parker, et al.
New copending U.S. Appl. No. 13/348,677, filed on Jan. 12, 2012, Emmett Dudley Crawford, et al.
USPTO Notice of Allowance dated Feb. 14, 2012 for copending U.S. Appl. No. 11/588,906.
New copending U.S. Appl. No. 13/398,262, filed on Feb. 26, 2012, Emmett Dudley Crawford, et al.

* cited by examiner

BLENDS OF POLYESTERS AND ABS COPOLYMERS

CROSS-REFERENCE TO RELATED APPLICATION

This application claims the benefit of the filing date of U.S. Provisional Patent Application No. 61/076,239, filed on Jun. 27, 2008; the entire content of which is hereby incorporated by reference.

FIELD OF THE INVENTION

The present invention generally relates to polymer blends comprising polyesters made from terephthalic acid; 2,2,4,4-tetramethyl-1,3-cyclobutanediol; and 1,4-cyclohexanedimethanol; and copolymers made from acrylonitrile, butadiene, and styrene (ABS). The blends are characterized by a unique combination of properties such as heat resistance, toughness, high modulus, and good flowability. The blends can be formed into, for example, molded articles, films, and fibers.

BACKGROUND OF THE INVENTION

Molding plastics, films, and fibers can be produced from a variety of plastic materials by a variety of processes such as extrusion blow molding, stretch blow molding, etc. These plastic materials may comprise mixtures of structurally different polymers or copolymers, which are referred to as polymer blends.

Polymer blending technology generally rests on the premise of property additivity. Typically, blending with a higher modulus polymer to increase stiffness will reduce the toughness and flowability of a given polymer.

In the present invention, however, it has been surprisingly discovered that adding a higher modulus ABS copolymer to a certain polyester results in a blend with not only a higher modulus than the original polyester, but also with better flowability and excellent toughness. In some cases, the blends even have greater toughness—particularly, low temperature toughness—than either of the component polymers.

SUMMARY OF THE INVENTION

The present invention generally relates to polymer blend compositions prepared by blending polyesters made from terephthalic acid; 2,2,4,4-tetramethyl-1,3-cyclobutanediol; and 1,4-cyclohexanedimethanol, with copolymers made from acrylonitrile, butadiene, and styrene (ABS) monomers. These polymer blends have a combination of toughness, heat resistance, high modulus, and good flowability making them particularly useful in films, fibers, packaging, and engineering molding plastics.

In one embodiment, the invention provides a polymer blend comprising:
(a) 5 to 95 weight percent of a polyester comprising:
  (i) a dicarboxylic acid portion comprising residues of terephthalic acid, isophthalic acid, or both; and
  (ii) a glycol portion comprising 5 to 100 mole percent of 2,2,4,4-tetramethyl-1,3-cyclobutanediol (TMCB) residues and 0 to 95 mole percent of 1,4-cyclohexanedimethanol (CHDM) residues; and
(b) 5 to 95 weight percent of a copolymer comprising acrylonitrile, butadiene, and styrene (ABS) monomers.

In another embodiment, the invention provides a polymer blend comprising:
(a) 60 to 95 weight percent of a polyester comprising:
  (i) a dicarboxylic acid portion comprising 90 to 100 mole percent of residues of terephthalic acid, isophthalic acid, or both; and
  (ii) a glycol portion comprising 5 to 50 mole percent of 2,2,4,4-tetramethyl-1,3-cyclobutanediol residues and 50 to 95 mole percent of 1,4-cyclohexanedimethanol residues; and
(b) 5 to 40 weight percent of a copolymer comprising 20 to 40 weight percent of acrylonitrile monomers, 20 to 40 weight percent of butadiene monomers, and 40 to 60 weight percent of styrene monomers.

DETAILED DESCRIPTION OF THE INVENTION

Surprisingly, it has been discovered that blends of (a) a copolyester comprising terephthalic acid; 2,2,4,4-tetramethyl-1,3-cyclobutanediol; and 1,4-cyclohexanedimethanol residues, with (b) a copolymer comprising acrylonitrile, butadiene, and styrene (ABS) monomers can have a combination of toughness, heat resistance, high modulus, and good flowability.

According to the present invention, there is provided a polymer blend comprising:
(a) 5 to 95 weight percent of a polyester comprising:
  (i) a dicarboxylic acid portion comprising residues of terephthalic acid, isophthalic acid, or both; and
  (ii) a glycol portion comprising 5 to 100 mole percent of 2,2,4,4-tetramethyl-1,3-cyclobutanediol (TMCB) residues and 0 to 95 mole percent of 1,4-cyclohexanedimethanol (CHDM) residues; and
(b) 5 to 95 weight percent of a copolymer comprising acrylonitrile, butadiene, and styrene (ABS) monomers.

In one embodiment, the blend comprises 60 to 95 weight percent of the polyester and 5 to 40 weight percent of the ABS compolymer. In another embodiment, the blend comprises about 70 to 90 weight percent of the polyester and about 10 to 30 weight percent of the ABS copolymer.

The polyesters used in the present invention typically can be prepared from dicarboxylic acids and diols, which react in substantially equal proportions and are incorporated into the polyester polymer as their corresponding residues. The polyesters of the present invention, therefore, can contain substantially equal molar proportions of acid residues (100 mole %) and diol residues (100 mole %) such that the total moles of repeating units is equal to 100 mole %. The mole percentages provided herein, therefore, may be based on the total moles of acid residues, the total moles of diol residues, or the total moles of repeating units. For example, a polyester containing 30 mole % of isophthalic acid residues, based on the total acid residues, means that there are 30 moles of isophthalic acid residues for every 100 moles of acid residues. In another example, a polyester containing 30 mole % of 2,2,4,4-tetramethyl-1,3-cyclobutanediol residues, based on the total diol residues, means that there are 30 moles of 2,2,4,4-tetramethyl-1,3-cyclobutanediol residues for every 100 moles of diol residues.

The term "polyester," as used herein, is intended to include "copolyesters."

The term "residue," as used herein, means any organic structure incorporated into a polymer through a polycondensation and/or an esterification reaction from the corresponding monomer. Thus, for example, the dicarboxylic acid residues may be derived from a dicarboxylic acid monomer or its associated acid halides, esters, salts, anhydrides, or mixtures thereof. Therefore, reference to a dicarboxylic acid is intended to include the dicarboxylic acid itself and any derivative of the dicarboxylic acid, including its associated isomers, acid halides, esters, half-esters, salts, half-salts, anhydrides, mixed anhydrides, and mixtures thereof, useful in a reaction with a diol to make a polyester. Examples of esters of the dicarboxylic acids useful in this invention include the dimethyl, diproplyl, diisopropyl, dibutyl, diphenyl, etc.

For example, the term "terephthalic acid" is intended to include terephthalic acid itself as well as any derivative of terephthalic acid, including its associated isomers, acid halides, esters, half-esters, salts, half-salts, anhydrides, mixed anhydrides, and mixtures thereof, useful in a reaction with a diol to make a polyester.

In one embodiment, terephthalic acid may be used as the diacid starting material for the polyester component. In another embodiment, isophthalic acid may be used as the diacid starting material. In another embodiment, mixtures of terephthalic acid and isophthalic acid may be used as the diacid starting material.

The dicarboxylic acid portion of the polyester may be substituted with up to 20 mol %, but preferably less than 10 mol %, of other aromatic dicarboxylic acids. Examples of suitable other aromatic dicarboxylic acids include 4,4'-biphenyidicarboxylic acid; 1,5-, 2,6-, and 2,7-naphthalenedicarboxylic acid; 4,4'-oxydibenzoic acid; and trans-4,4'-stilbenedicarboxylic acid. In addition, the dicarboxylic acid portion of the polyester may be substituted with aliphatic or cycloaliphatic dicarboxylic acids containing 6 to 12 carbon atoms such as succinic, glutaric, adipic, sebacic, suberic, azelaic, decanedicarboxylic, and dodecanedicarboxylic acids.

The TMCB may be cis, trans, or a mixture of the two. The CHDM may be cis, trans, or a mixture of the two.

The glycol portion of the polyester may contain up to 10 mol %, but preferably less than 5 mol %, of another glycol containing 2 to 16 carbon atoms. Examples of suitable other glycols include ethylene glycol, 1,2-propanediol, 1,3-propanediol, neopentyl glycol, 1,4-butanediol, 1,5-pentanediol, 1,6-hexanediol, and p-xylene glycol. The polyester may also be modified with polyethylene glycols or polytetramethylene glycols.

In one embodiment, the dicarboxylic acid portion of the polyester comprises 100 mole percent of terephthalic acid residues, and the glycol portion of the polyester comprises 5 to 70 mole percent of TMCB residues and 30 to 95 mole percent of CHDM residues. In another embodiment, the dicarboxylic acid portion of the polyester comprises 100 mole percent of terephthalic acid residues, and the glycol portion of the polyester comprises 5 to 50 mole percent of TMCB residues and 50 to 95 mole percent of CHDM residues.

In one embodiment, the polyester component of the polymer blend has a glass transition temperature (Tg) ranging from 90 to 140° C. The Tg may be determined, for example, by using a TA Instruments differential scanning calorimeter (DSC) instrument at a scan rate of 20° C./min.

In another embodiment, the polyester component of the polymer blend has a glass transition temperature ranging from 100 to 130° C.

In one embodiment, the inherent viscosity of the polyester component ranges from 0.4 to 0.9 dL/g as determined in 60/40 (wt/wt) phenol/tetrachloroethane at a concentration of 0.5 g/100 ml at 25° C.

In another embodiment, the inherent viscosity of the polyester ranges from 0.5 to 0.8 dL/g.

The polyester component of the polymer blend may be prepared by methods known in the art.

The ABS copolymers used in the present invention can be prepared by methods known in the art. For example, it may be made by polymerizing styrene and acrylonitrile in the presence of polybutadiene. The monomers are incorporated into the ABS copolymer as their corresponding residues.

In one embodiment, the ABS component of the polymer blend comprises:
15 to 40 mole % of acrylonitrile monomers;
6 to 40 mole % of butadiene monomers; and
40 to 80 mole % of styrene monomers.

In another embodiment, the ABS component of the polymer blend comprises:
20 to 40 mole % of acrylonitrile monomers;
20 to 40 mole % of butadiene monomers; and
40 to 60 mole % of styrene monomers.

Unless the context indicates otherwise, as used herein, the term "acrylonitrile" is intended to include acrylonitrile itself and any derivative of acrylonitrile that can be used in the preparation of ABS copolymers, such as methacrylonitrile, as well as the corresponding residues thereof, and mixtures thereof. Unless the context indicates otherwise, as used herein, the term "butadiene" is intended to include butadiene itself and any other diene that can be used in the preparation of ABS copolymers, such as ethylene-propylene diene monomer (EPDM), the corresponding residues thereof, and mixtures thereof. The term also includes saturated acrylate elastomer. The butadiene of the ABS copolymer typically exists as a separate phase with a particle size in the range from 0.1 to 5 microns. The butadiene phase may have a bimodal size distribution.

Unless the context indicates otherwise, as used herein, the term "styrene" is intended to include styrene itself and any derivative of styrene that can be used in the preparation of ABS copolymers, such as alpha methylstyrene, as well as the corresponding residues thereof, and mixtures thereof.

The ABS copolymer may be modified by addition of another copolymer such as styrene-maleic anhydride copolymers, methyl methacrylate alpha-methylstryrene copolymers, styrene-maleic anhydride-methyl methacrylate copolymers, and acrylic acid copolymers.

The polymer blend may comprise 0.01 to 25 weight percent of at least one additive chosen from colorants, dyes, mold release agents, flame retardants, plasticizers, nucleating agents, UV light stabilizers, thermal stabilizers, fillers, impact modifiers, processing aids, and reinforcing materials such as glass fibers.

The polymer blends of the present invention can be made by conventional mixing methods known in the art, such as melt blending or solution blending. Suitable methods include, but are not limited to, the steps of mixing the polyester and the ABS copolymer components in powder or granular form in an extruder, extruding the mixture into strands, chopping the strands into pellets, and molding the pellets into the desired article(s).

In one embodiment, the polymer blend according to the invention comprises:
(a) 60 to 95 weight percent of a polyester comprising:
(i) a dicarboxylic acid portion comprising 90 to 100 mole percent of residues of terephthalic acid, isophthalic acid, or both; and
(ii) a glycol portion comprising 5 to 50 mole percent of 2,2,4,4-tetramethyl-1,3-cyclobutanediol residues and 50 to 95 mole percent of 1,4-cyclohexanedimethanol residues; and
(b) 5 to 40 weight percent of a copolymer comprising 20 to 40 weight percent of acrylonitrile monomers, 20 to 40 weight percent of butadiene monomers, and 40 to 60 weight percent of styrene monomers.

In another embodiment, the polymer blend comprises about 70 to 90 weight percent of the polyester and about 10 to 30 weight percent of the ABS copolymer.

Another aspect of the present invention relates to articles of manufacture comprising the polymer blends of the invention. Such articles of manufacture can be chosen from films, sheets, fibers, and molded articles.

In one embodiment, the polymer blends of the invention are useful as housing of consumer electronics. Consumer electronics include electronic equipment intended for everyday use. Consumer electronics are most often used in entertainment, communications, and office productivity. Some products classed as consumer electronics include, but are not limited to, personal computers, telephones, MP3 players, audio equipment, televisions, calculators, GPS automotive navigation systems, and playback and recording of video media such as DVDs, CDs, VHS's or camcorders.

In another embodiment, the blends of the invention are useful for and/or in medical equipment housings.

This invention can be further illustrated by the following working examples, although it should be understood that these examples are included merely for purposes of illustration and are not intended to limit the scope of the invention.

EXAMPLES

Measurement Methods

The inherent viscosity of the polyesters was determined in a 60/40 (wt/wt) phenol/tetrachloroethane mixture at a concentration of 0.5 g/100 ml at 25° C.

The glass transition temperature (Tg) was determined using a TA Instruments DSC instrument at a scan rate of 20° C./min.

The glycol content and the cis/trans ratio of the polyesters were determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume) for polymers or, for oligomeric samples, 60/40 (wt/wt) phenol/tetrachloroethane with deuterated chloroform added for lock. Peak assignments for 2,2,4,4-tetramethyl-1,3-cyclobutanediol resonances were made by comparison to model mono- and dibenzoate esters of 2,2,4,4-tetramethyl-1,3-cyclobutanediol. These model compounds closely approximate the resonance positions found in the polymers and oligomers.

The melt viscosity was measured using a Rheometrics Dynamic Analyzer (RDA II). The melt viscosity was measured as a function of shear rate, at frequencies ranging from 1 to 400 rad/sec, at the temperatures reported.

Unless otherwise specified, heat deflection temperature was determined at 264 psi according to ASTM D648. Flexural modulus and flexural strength were determined according to ASTM D790. Tensile properties were determined according to ASTM D638. Flatwise impact strength was determined according to ASTM D3763.

Blending Method

Unless otherwise specified, polymer blends were prepared in a 18-mm Leistritz twin-screw extruder. The polymers were premixed by tumble blending and fed into the extruder. The extruded strand was pelletized. The pellets were then injection molded into parts on a Toyo 90 injection molding machine. The extruder was run at 350 rpms at a feed rate to give a machine torque between 80-100%.

Example 1

Polymer blends were prepared with varying concentrations of copolyester and ABS copolymer.

The copolyester component of the blends contained 100 mole % of terephthalic acid residues, 46.0 mole % of TMCB residues (46.1 mole % cis isomer), and 54 mole % of CHDM residues. The inherent viscosity of the copolyester was measured to be 0.59 dL/g.

The ABS copolymer component of the blends contained 26.2 mole % of acrylonitrile, 29.7 mole % butadiene, and 44.1 mole % styrene.

The copolyester was dried at 90° C. and the ABS copolyester was dried at 80° C. before making the polymer blends according to the method described above. Processing temperatures used during extrusion and molding were in the range of 260 to 290° C.

The compositions and properties of the blends are shown in Table 1.

TABLE 1

|  | Blend | | | | | | |
| --- | --- | --- | --- | --- | --- | --- | --- |
|  | A | B | C | D | E | F | G |
| Copolyester (wt %) | 100 | 90 | 80 | 70 | 50 | 30 | 0 |
| ABS Copolymer (wt %) | 0 | 10 | 20 | 30 | 50 | 70 | 100 |
| Heat Deflection Temp. at 264 psi (° C.) | 99 | 96 | 94 | 92 | 87 | 85 | 79 |
| Tensile Strength (MPa) | 46 | 46 | 44 | 44 | 42 | 41 | 38 |
| Tensile Break Elongation (%) | 83 | 76 | 84 | 92 | 36 | 15 | 5 |
| Flexural Modulus (MPa) | 1617 | 1684 | 1730 | 1779 | 1813 | 1821 | 1800 |
| Flexural Strength (MPa) | 69 | 68 | 68 | 70 | 62 | 60 | 55 |
| Flatwise Impact Strength at −40° C. | | | | | | | |
| Energy at Max Load (J) | 39.7 | 44.1 | 44.8 | 25.9 | 24.9 | 12.6 | 9.4 |
| Total Energy (J) | 41.3 | 44.8 | 45.2 | 26.2 | 26.1 | 12.7 | 9.6 |
| DSC Tg (second cycle) (° C.) | 126 | 124 | 112 | 111 | 110 | 109 | 108 |
|  |  |  | 124 | 124 | 122 | 120 |  |
| Viscosity at 260° C. and 158 rad/sec (Poise) | 14,760 | 13,880 | 13,140 | 12,210 | 9804 | 7821 | 5999 |

The two Tg values for some blends in Table 1 suggest that those blends have two phases. It is likely that blend B also has two phases, but the Tg for the 10% ABS phase is too weak to be detected by DSC. Addition of the ABS causes an increase in modulus over the entire range of blend compositions. At the same time, the melt viscosity continuously decreases. The blends also have good low temperature flatwise impact strengths, which, in some cases, are even higher than that of the pure copolyester.

Example 2

Polymer blends were prepared with varying concentrations of copolyester and ABS copolymer.

The same copolyester of Example 1 was used.

The ABS copolymer component of the blends contained 29.7 mole % of acrylonitrile, 23.3 mole % of butadiene, and 46.9 mole % of styrene.

The copolyester was dried at 90° C. and the ABS copolymer was dried at 80° C. before preparing the polymer blends according to the method described above. Processing temperatures used during extruding and molding were in the range of 260 to 290° C. The compositions and properties of the blends are shown in Table 2.

TABLE 2

| | Blend | | | | |
|---|---|---|---|---|---|
| | A | B | C | D | E |
| Copolyester (wt %) | 100 | 85 | 70 | 50 | 0 |
| ABS Copolymer (wt %) | 0 | 15 | 30 | 50 | 100 |
| Heat Deflection Temp. at 264 psi (° C.) | 100 | 96 | 92 | 88 | 81 |
| Tensile Strength (MPa) | 47 | 47 | 47 | 46 | 45 |
| Tensile Break Elongation (%) | 63 | 88 | 60 | 26 | 9 |
| Flexural Modulus (MPa) | 1655 | 1829 | 1934 | 2048 | 2267 |
| Flexural Strength (MPa) | 70 | 74 | 72 | 71 | 66 |
| Flatwise Impact Strength at −40° C. | | | | | |
| Energy at Max Load (J) | 39.7 | 53.1 | 39.2 | 7.3 | 5.6 |
| Total Energy (J) | 41.3 | 54.5 | 40.8 | 7.4 | 5.7 |
| DSC Tg (second cycle) (° C.) | 127 | 113 126 | 112 124 | 111 122 | 108 |
| Viscosity at 260° C. and 158 rad/sec (Poise) | 14,950 | 14,840 | 12,240 | 8721 | 4562 |

Two Tg values were reported in Table 2 for blends having two phases.

Similar to Example 1, addition of the ABS causes an increase in the modulus and decrease in melt viscosity over the entire range of blend compositions. In at least one case, the low temperature flatwise impact strength of the blend is higher than that of the pure copolyester.

Example 3

Polymer blends were prepared with varying concentrations of copolyester and ABS copolymer.

The copolyester component of the blends contained 100 mole % of terephthalic acid residues, 23.5 mole % of TMCB residues (54.4 mole % cis isomer), and 76.5 mole % of CHDM residues. The inherent viscosity of the copolyester was measured to be 0.67 dL/g.

The same ABS copolymer of Example 1 was used.

The copolyester was dried at 90° C. and the ABS copolymer was dried at 80° C. before making the blends according to the method described above. Processing temperatures used during extruding and molding were in the range of 260 to 270° C.

The compositions and properties of the blends are shown in Table 3.

TABLE 3

| | Blend | | | | | |
|---|---|---|---|---|---|---|
| | A | B | C | D | E | F |
| Copolyester (wt %) | 100 | 90 | 80 | 70 | 50 | 0 |
| ABS Copolymer (wt %) | 0 | 10 | 20 | 30 | 50 | 100 |
| Heat Deflection Temp. at 264 psi (° C.) | 83 | 84 | 82 | 79 | 80 | 82 |
| Tensile Strength (MPa) | 43 | 43 | 43 | 42 | 41 | 38 |

TABLE 3-continued

| | Blend | | | | | |
|---|---|---|---|---|---|---|
| | A | B | C | D | E | F |
| Tensile Break Elongation (%) | 161 | 159 | 144 | 147 | 42 | 6 |
| Flexural Modulus (MPa) | 1500 | 1547 | 1610 | 1638 | 1685 | 1733 |
| Flexural Strength (MPa) | 63 | 63 | 61 | 60 | 60 | 54 |
| Flatwise Impact Strength at −40° C. | | | | | | |
| Energy at Max Load (J) | 44 | 61 | 53 | 56 | 45 | 9 |
| Total Energy (J) | 47 | 68 | 64 | 63 | 48 | 10 |
| DSC Tg (second cycle) (° C.) | 109 | 108 | 108 | 108 | 107 | 109 |
| Viscosity at 260° C. and 400 rad/sec (Poise) | 5871 | 6040 | 5689 | 5456 | 4672 | 3368 |

In this example, addition of the ABS again causes a continuous increase in modulus. In this case, all of the blend compositions have a higher low temperature flatwise impact strength than the pure copolyester. With the exception of the composition with 10% ABS, all of the blends also have a lower melt viscosity than the pure copolyester.

Comparative Example 1

Polymer blends were prepared with varying concentrations of copolyester and ABS copolymer.

The copolyester used in the blends contained 100 mole % of terephthalic acid residues, 80 mole % of CHDM residues, and 20 mole % of ethylene glycol (EG) residues. The inherent viscosity of the copolyester was 0.75 dL/g.

The same ABS copolymer of Example 1 was used.

The copolyester was dried at 70° C. and the ABS copolymer was dried at 80° C. before preparing the blends according to the method described above. Processing temperatures used during extruding and molding were in the range of 260 to 270° C.

The compositions and properties of the blends are shown in Table 4.

TABLE 4

| | Blend | | | | | |
|---|---|---|---|---|---|---|
| | A | B | C | D | E | F |
| Copolyester (wt %) | 100 | 90 | 80 | 70 | 50 | 0 |
| ABS Copolymer (wt %) | 0 | 10 | 20 | 30 | 50 | 100 |
| Heat Deflection Temp. at 264 psi (° C.) | 65 | 66 | 66 | 65 | 69 | 79 |

TABLE 4-continued

| | Blend | | | | | |
|---|---|---|---|---|---|---|
| | A | B | C | D | E | F |
| Tensile Strength (MPa) | 42 | 42 | 41.6 | 41.5 | 41 | 38 |
| Tensile Break Elongation (%) | 272 | 238 | 208 | 183 | 36 | 5 |
| Flexural Modulus (MPa) | 1700 | 1586 | 1618 | 1700 | 1670 | 1800 |
| Flexural Strength (MPa) | 57 | 58 | 58 | 57 | 57 | 55 |
| Flatwise Impact Strength at −40° C. | | | | | | |
| Energy at Max Load (J) | 53 | 51 | 51 | 47 | 46 | 9.4 |
| Total Energy (J) | 65 | 72 | 70 | 66 | 64 | 9.6 |
| DSC Tg (second cycle) (° C.) | 89 | 89 | 88 | 88 | 86 | 108 |
| | | 111 | 111 | 112 | 110 | |
| Viscosity at 260° C. and 158 rad/sec (Poise) | 5591 | 6218 | 6279 | 5891 | 6018 | NT |

NT = Not Tested

Two Tg values were reported in Table 4 for blends having two phases. Contrary to the blends of Examples 1-3, the flexural modulus of the blends in Table 4 were all less than or equal to the flexural modulus of the neat copolyester. In addition, the melt viscosities of the blends were higher than those of the neat copolyester.

Comparative Example 2

Polymer blends were prepared with varying concentrations of copolyester and ABS copolymer.

The copolyester used in the blends contained 100 mole % of terephthalic acid residues, 62 mole % of CHDM residues, and 38 mole % of EG residues. The inherent viscosity of the copolyester was 0.73 dL/g.

The same ABS copolymer of Example 1 was used.

The copolyester was dried at 70° C. and the ABS copolymer was dried at 80° C. before preparing the blends according the method described above. Processing temperatures used during extruding and molding were in the range of 260 to 270° C. The compositions and properties of the blends are shown in Table 5.

TABLE 5

| | Blend | | | | | |
|---|---|---|---|---|---|---|
| | A | B | C | D | E | F |
| Copolyester (wt %) | 100 | 90 | 80 | 70 | 50 | 0 |
| ABS Copolymer (wt %) | 0 | 10 | 20 | 30 | 50 | 100 |
| Heat Deflection Temp. at 264 psi (° C.) | 64 | 65 | 66 | 65 | 69 | 79 |
| Tensile Strength (MPa) | 45 | 44 | 44 | 43 | 42 | 38 |
| Tensile Break Elongation (%) | 292 | 347 | 306 | 276 | 46 | 5 |
| Flexural Modulus (MPa) | 1702 | 1722 | 1763 | 1755 | 1777 | 1800 |
| Flexural Strength (MPa) | 61 | 61 | 61 | 60 | 60 | 55 |

TABLE 5-continued

| | Blend | | | | | |
|---|---|---|---|---|---|---|
| | A | B | C | D | E | F |
| Flatwise Impact Strength at −40° C. | | | | | | |
| Energy at Max Load (J) | 50 | 45 | 45 | 44 | 37 | 9.4 |
| Total Energy (J) | 73 | 68 | 66 | 63 | 53 | 9.6 |
| DSC Tg (second cycle) (° C.) | 86 | 86 | 84 | 84 | 81 | 108 |
| | | | 110 | 110 | 109 | |

Two Tg values were reported in Table 5 for blends having two phases.

Contrary to the blends of Examples 1-3, the flatwise impact strength measured by both total energy and energy at max load of the polymer blends of this comparative example were all less than those of the neat copolyester.

Comparative Example 3

Polymer blends were prepared with varying concentrations of copolyester and copolymer.

The copolyester used in the blends contained 100 mole % of terephthalic acid residues, 24.8 mole % of TMCB residues (54.6 mole % cis isomer), and 75.2 mole % of CHDM residues. The inherent viscosity was measured to be 0.72 dL/g.

A copolymer of styrene and acrylonitrile (SAN) was used in place of the ABS copolymer. This copolymer contained 37.5 mole % of acrylonitrile and 62.5 mole % of styrene.

The copolyester was dried at 90° C. and the SAN copolymer was dried at 80° C. before preparing the blends according to the method described above. Processing temperatures used during extruding and molding were in the range of 240 to 270° C. The compositions and properties of the blends are shown in Table 6.

TABLE 6

| | Blend | | | | | | |
|---|---|---|---|---|---|---|---|
| | A | B | C | D | E | F | G |
| Copolyester (wt %) | 100 | 90 | 80 | 70 | 50 | 25 | 0 |
| ABS Copolymer (wt %) | 0 | 10 | 20 | 30 | 50 | 75 | 100 |
| Heat Deflection Temp. at 264 psi (° C.) | 82 | 82 | 81 | 82 | 80 | 84 | 83 |
| Tensile Strength (MPa) | 44 | 48 | 52 | 57 | 67 | 71 | 71 |
| Tensile Break Elongation (%) | 138 | 129 | 106 | 46 | 14 | 3 | 3 |
| Flexural Modulus (MPa) | 1532 | 1713 | 1965 | 2189 | 2589 | 3069 | 3710 |
| Flexural Strength (MPa) | 63 | 70 | 76 | 84 | 95 | 109 | 106 |

TABLE 6-continued

| | Blend | | | | | | |
|---|---|---|---|---|---|---|---|
| | A | B | C | D | E | F | G |
| Flatwise Impact Strength at −40° C. | | | | | | | |
| Energy at Max Load (J) | 50.52 | 46.0 | 15.1 | 22.6 | NT | 1.2 | 1.5 |
| Total Energy (J) | 56.46 | 52.0 | 15.4 | 22.7 | NT | 1.9 | 2.1 |
| DSC Tg (second cycle) (° C.) | 110 | 110 | 109 | 109 | 109 | 107 | 107 |

NT = Not Tested

Contrary to the blends of Examples 1-3, the flatwise impact strength measured by both total energy and energy at max load of the blends of this comparative example were all less than those of the neat copolyester.

It can be seen from a comparison of the data in the above examples that polymer blends according to the present invention offer a definite advantage over other polymer blends with regard to impact strength, glass transition temperature, modulus, melt viscosity, and/or toughness.

The invention has been described in detail with particular reference to preferred embodiments thereof, but it will be understood that variations and modifications can be effected within the spirit and scope of the invention.

I claim:

1. A polymer blend comprising:
   (a) 70 to 90 weight percent of a polyester comprising:
      (i) a dicarboxylic acid portion comprising residues of terephthalic acid, isophthalic acid, or both; and
      (ii) a glycol portion comprising 5 to 70 mole percent of 2,2,4,4-tetramethyl-1,3-cyclobutanediol (TMCB) residues and 30 to 95 mole percent of 1,4-cyclohexanedimethanol (CHDM) residues; and
   (b) 10 to 30 weight percent of a copolymer comprising acrylonitrile, butadiene, and styrene (ABS) monomers,
   wherein the blend has a flexural modulus from about 5 to about 20% greater than the flexural modulus of the polyester, and
   wherein the blend has a melt viscosity from about 5 to about 20% less than the melt viscosity of the polyester.

2. The polymer blend according to claim 1, wherein the dicarboxylic acid portion of the polyester comprises 100 mole percent of terephthalic acid residues.

3. The polymer blend according to claim 2, wherein the glycol component of the polyester comprises 5 to 50 mole percent of TMCB residues and 50 to 95 mole percent of CHDM residues.

4. The polymer blend according to claim 1, wherein the ABS copolymer comprises 15 to 40 mole percent of acrylonitrile monomers, 6 to 40 mole percent of butadiene monomers, and 40 to 80 mole percent of styrene monomers.

5. The polymer blend according to claim 4, wherein the ABS copolymer comprises 20 to 40 mole percent of acrylonitrile monomers, 20 to 40 mole percent of butadiene monomers, and 40 to 60 mole percent of styrene monomers.

6. The polymer blend according to claim 1, wherein the dicarboxylic acid portion of the polyester comprises up to 20 mole percent of residues of another aromatic dicarboxylic acid, an aliphatic dicarboxylic acid, a cycloaliphatic dicarboxylic acid, or mixtures thereof.

7. The polymer blend according to claim 1, wherein the glycol portion of the polyester comprises up to 10 mole percent of residues of another glycol containing 2 to 16 carbon atoms.

8. The polymer blend according to claim 1, which further comprises 0.01 to 25 weight percent of one or more additives selected from colorants, dyes, mold release agents, flame retardants, plasticizers, nucleating agents, light stabilizers, thermal stabilizers, fillers, impact modifiers, and reinforcing materials.

9. A polymer blend comprising:
   (a) 60 to 95 weight percent of a polyester comprising:
      (i) a dicarboxylic acid portion comprising 90 to 100 mole percent of residues of terephthalic acid, isophthalic acid, or both; and
      (ii) a glycol portion comprising 5 to 70 mole percent of 2,2,4,4-tetramethyl-1,3-cyclobutanediol residues and 30 to 95 mole percent of 1,4-cyclohexanedimethanol residues; and
   (b) 5 to 40 weight percent of a copolymer comprising 20 to 40 mole percent of acrylonitrile monomers, 20 to 40 mole percent of butadiene monomers, and 40 to 60 mole percent of styrene monomers,
   wherein the blend has a flexural modulus from about 5 to about 20% greater than the flexural modulus of the polyester, and
   wherein the blend has a melt viscosity from about 5 to about 20% less than the melt viscosity of the polyester.

10. The polymer blend according to claim 9, which comprises about 70 to 90 weight percent of the polyester and about 10 to 30 weight percent of the ABS copolymer.

* * * * *

UNITED STATES PATENT AND TRADEMARK OFFICE
CERTIFICATE OF CORRECTION

PATENT NO. : 8,198,371 B2
APPLICATION NO. : 12/390694
DATED : June 12, 2012
INVENTOR(S) : Stack It is certified that error appears in the above-identified patent and that said Letters Patent is hereby corrected as shown below:

Column 12, Line 38, Claim 9 "a glycol portion comprising 5 to 70" should read
-- a glycol portion comprising 5 to 50 --

Column 12, Line 40, Claim 9 "30 to 95 mole percent" should read -- 50 to 95 mole percent --

Signed and Sealed this
Thirty-first Day of July, 2012

David J. Kappos
*Director of the United States Patent and Trademark Office*